March 13, 1962  O. WITTEL ETAL  3,024,715
AUTOMATIC EXPOSURE CONTROL FOR PHOTOGRAPHIC CAMERAS
Filed March 30, 1959  3 Sheets-Sheet 1

Otto Wittel
Cameron B. Estes
INVENTORS

BY R. Frank Smith
Robert W. Hampton
ATTORNEYS

March 13, 1962 O. WITTEL ETAL 3,024,715
AUTOMATIC EXPOSURE CONTROL FOR PHOTOGRAPHIC CAMERAS
Filed March 30, 1959 3 Sheets-Sheet 2
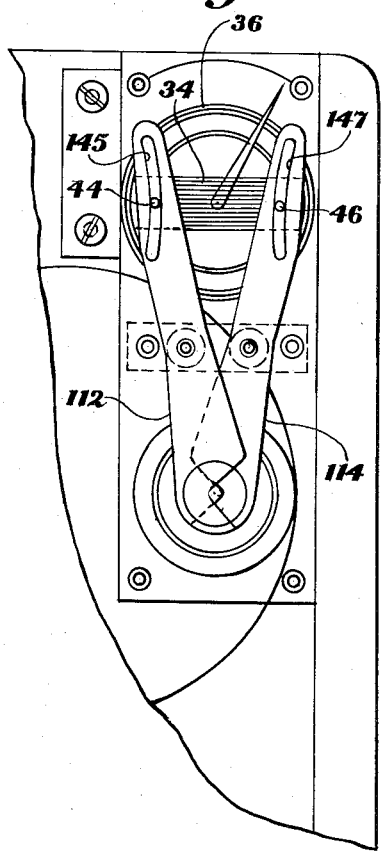
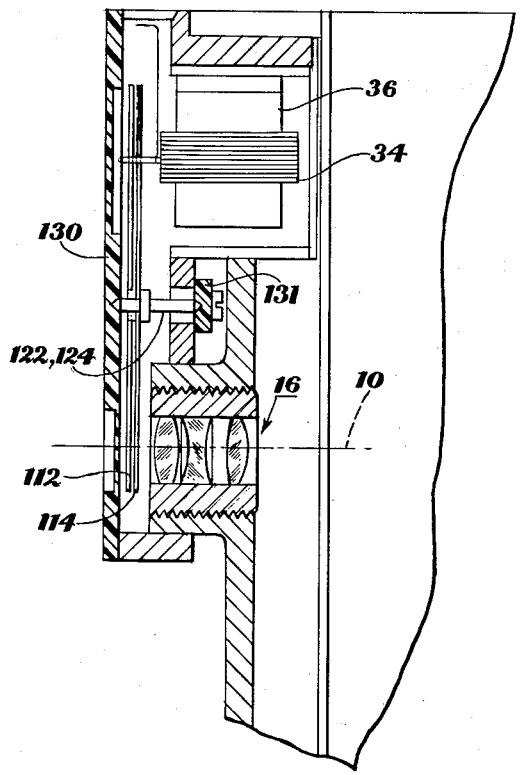
Otto Wittel
Cameron B. Estes
INVENTORS
BY R. French Smith
Robert W. Hampton
ATTORNEYS

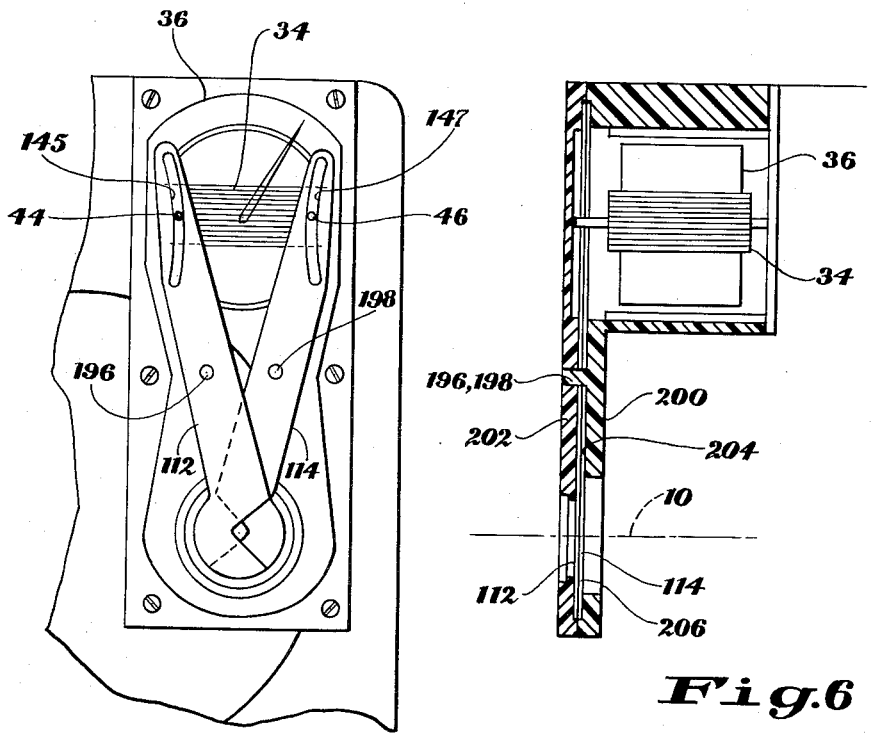

United States Patent Office 3,024,715
Patented Mar. 13, 1962

3,024,715
AUTOMATIC EXPOSURE CONTROL FOR PHOTOGRAPHIC CAMERAS
Otto Wittel and Cameron B. Estes, Rochester, N.Y., assignors to Eastman Kodak Company, Rochester, N.Y., a corporation of New Jersey
Filed Mar. 30, 1959, Ser. No. 802,899
8 Claims. (Cl. 95—64)

The present invention relates to photographic cameras and more particularly concerns automatic exposure control apparatus for such cameras.

The exposure of film in a camera may be regulated automatically by adjusting the shutter speed or the exposure aperture or both as a function of scene brightness. In cameras wherein the exposure aperture is adjusted automatically it has been a common practice to employ an exposure meter for moving one or more diaphragm vanes differentially as a function of the degree of energization of a photoelectric cell in the meter by light from the viewed scene or object.

It is a primary object of the present invention to provide an improved mechanism for driving one or more diaphragm vanes under control of an exposure meter.

A further object of the invention is to provide a pin-and-slot coupling between an exposure meter and at least one diaphragm vane.

A further object is to provide a rugged, inexpensive automatic exposure control system.

Further objects of the invention will appear from the following description, reference being made to the accompanying drawings wherein:

FIGS. 3 and 4 are corresponding views of a second embodiment of the invention; and FIGS. 5 and 6 are corresponding views of a third embodiment of the invention.

Figures 1, 2:
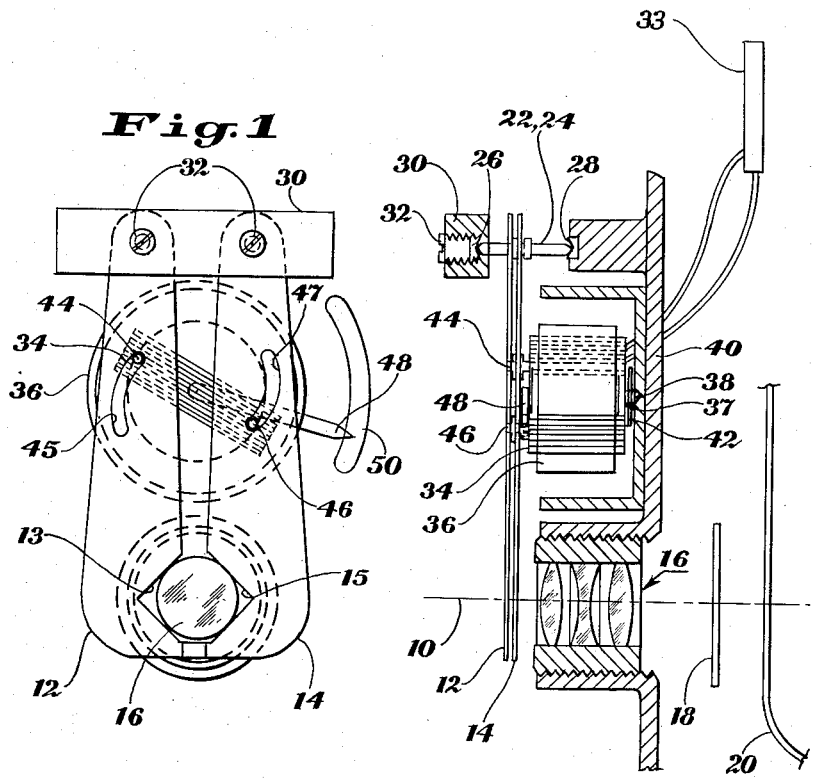
FIGS. 1 and 2 are front and side views, respectively, of a first embodiment of the invention.

Referring to FIGS. 1 and 2, the invention is employed in a camera having a lens axis 10 on which are located a pair of diaphragm vanes 12 and 14, a lens system indicated generally at 16, a shutter shown schematically at 18 and a photosensitive surface such as a film strip 20. The diaphragm vanes 12 and 14 have respective cutout portions or apertures 13 and 15 on the lens axis 10 to form a composite exposure aperture. The vanes are suspended from respective posts 22 and 24, which in turn are supported for pivoting motion in respective pairs of jeweled bearings such as 26 and 28. One of the bearings for each post (illustrated as bearing 26 in FIG. 2) may be adjustable, for example by being mounted in threading engagement with a frame member 30 and having a screw head 32 for moving that bearing toward or away from the corresponding vane post 22 or 24.

The diaphragm vanes may be pivoted in opposite directions on their posts 22 and 24 to regulate the size of the exposure aperture on the lens axis. The mechanism for pivoting the vanes includes a photoelectric cell 33 which is positioned for illumination by light from the scene or object that is to be photographed. Cell 33 is connected to the coil 34 of an electric measuring instrument 36. Coil 34 is supported by posts such as 37 for pivoting movement about a horizontal axis in bearings such as 38 which are mounted in fixed frame members such as 40.

The apparatus comprising the cell 33 and the instrument 36 is well known in the art and is representative of a class of devices which may be referred to as exposure meters. A meter of this type translates light energy into mechanical energy and for this purpose has a mechanical output member such as coil 34, whose position or motion is changed as a function of the intensity of the light from the viewed scene. Instead of a pivoted-coil instrument, an exposure meter may include a hot-wire actuator or a solenoid or other device having a sensitive electrical input and a mechanical output member. In the illustrated form of the exposure meter, coil 34 is angularly positioned as a function of the intensity of scene light and normally is maintained in a zero-deflection position by return springs, such as 42.

A pair of drive pins 44 and 46 are mounted on coil 34 parallel to the axis thereof and are spaced from the coil axis. Pins 44 and 46 cooperate with respective drive slots 45 and 47 in vanes 12 and 14 to rock the vanes about their pivots in response to rotation of the coil, and thereby to change the size of the exposure aperture as a function of scene brightness. The geometry of the diaphragm vanes 12 and 14, their aperture cutouts 13 and 15 and their slots 45 and 47, as well as the relative positions of the vane-support posts 22 and 24 and the drive vanes 44 and 46, are such that the bottoms of the vanes are separated to form an exposure aperture of maximum area, i.e., to uncover substantially the entire area of the lens system 16, when there is a minimum scene brightness, and to overlap for minimizing the size of the exposure aperture when there is a maximum scene brightness.

In pivoted coil instruments of the types shown in FIGS. 1 and 2 the instrument coil generally produces the least torque at its zero-deflection position. Therefore, it has been found convenient to use gravity in such manner that the coil load is minimized when the coil is at or near its zero-deflection position. For this purpose, the vane supports are spaced so that the vanes hang vertically to form an exposure aperture of maximum area when the coil is in its zero-deflection position. This arrangement of the vanes is especialy useful in motion picture cameras, which generally are held in only a vertical plane during operation. A further advantage of the vane drive system disclosed above is that the blades are required to travel through only a small angle in order to vary the exposure aperture through its entire range of area, thereby permitting the drive vanes 44 and 46 to be located close to the coil axis and permitting the use of a small, compact measuring instrument.

The photographer may be apprised of the positions of the diaphragm vanes by means of a pointer 48 mounted on the instrument coil for rotation therewith and co-operating with an aperture scale 50 which may be visible in the viewfinder (not shown) of the camera.

A second embodiment of the invention is shown in FIGS. 3 and 4, wherein the diaphragm vanes 112 and 114 are pivoted on their respective posts 122 and 124 near the centers of the vanes, rather than near their upper ends. This permits each of the drive slots 145 and 147 to have a nearly straight form. In order to minimize manufactuning costs, the bearings for posts 122 and 124 may be formed in fixed members, such as 130 and 131, made of nylon or other plastic material.

A third embodiment of the invention is shown in FIGS. 5 and 6, wherein the vanes 112 and 114 are pivoted centrally as in FIGS. 3 and 4, but wherein the pivots comprise studs 196 and 198 which are formed integrally with a fixed frame member 200. This frame member, together with a second fixed frame member 202, forms a thin housing 204 in which the vanes are adapted to move. The housing may be divided by a thin separator 206 to form separate pockets for the respective vanes. In order to minimize manufacturing costs, frame member 200 and its integral pivot studs 196 and 198, as well as frame member 202, may be molded of nylon or other plastic material. The surfaces of housing 204 and separator 206 that come into contact with the vanes may be corrugated to minimize initial friction and possible sticking due to humidity. The separator 206 may be formed of metal to minimize static adherence of the blades to that separator.

The invention has been described in detail with particular reference to preferred embodiments thereof, but it will be understood that variations and modifications can be effcted within the spirit and scope of the invention as described hereinabove and as defined in the appended claims.

We claim:

1. In a camera having a lens system for focusing an image of a viewed scene onto a photosensitive surface; a photoelectric cell disposed for illumination by light from said scene; and a galvanometer having a movable coil connected to said cell and energized thereby to position said coil as a function of the intensity of said light; the combination comprising: a pair of diaphragm vanes disposed for movement relative to said lens system and to each other, each vane having a respective variable-width aperture cooperating with the aperture in the other vane to form an exposure aperture, a respective pivotal mounting for each vane; and a respective pin-and-slot coupling between said coil and each of said vanes for moving the latter oppositely relative to said lens system in response to movement of said coil, thereby to vary the size of said exposure aperture as a function of the intensity of said light, the pivotal mounting and coupling of each vane being above and approximately in vertical alignment with the aperture of said vane when said exposure aperture exposes a maximum area of said lens system with said camera held in a predetermined, normal picture-taking position, whereby the load on said coil is substantially at a minimum when the area of said exposure aperture is at a maximum.

2. The combination defined in claim 1, wherein: each of said vanes is pivotally mounted near its upper end; the aperture of each vane is formed near the lower end thereof; the drive slot of each vane is formed between the pivotal mounting and the aperture thereof; and the exposure aperture exposes substantially the entire lens area of said lens system when said vanes hang vertically from their respective pivotal mountings.

3. The combination defined in claim 1, wherein: the drive slot of each vane is formed near the upper end thereof; the aperture of each vane is formed near the lower end thereof; and each vane is pivotally mounted between its drive slot and its aperture.

4. The combination defined in claim 1, with: a fixed frame member having a pair of studs formed integrally therewith, each of said vanes being pivotally mounted on a respective one of said studs.

5. The combination defined in claim 1, with first and second fixed frame members having respective cut-out portions in mutual facing relation to form a thin housing for said vanes.

6. The combination defined in claim 5, with a thin, fixed separator in said housing forming separate pockets for the respective vanes.

7. The combination defined in claim 5, wherein said separator is formed of metal and said frame members are formed of a plastic material.

8. The combination defined in claim 5, wherein at least a part of the mutually facing surfaces of the cut-out portions of said frame members are roughened.

References Cited in the file of this patent

UNITED STATES PATENTS

| | | |
|---|---|---|
| 2,206,086 | Galyon | July 2, 1940 |
| 2,421,499 | Guedon | June 3, 1947 |

FOREIGN PATENTS

| | | |
|---|---|---|
| 201,423 | Austria | Jan. 10, 1959 |